US007827477B2

(12) United States Patent
Kobayashi et al.

(10) Patent No.: US 7,827,477 B2
(45) Date of Patent: Nov. 2, 2010

(54) EDITING A WEB SITE USING A PLURALITY OF EDITING ENVIRONMENTS

(75) Inventors: Takumi Kobayashi, Yamato (JP); Tadahiko Nakamura, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 1247 days.

(21) Appl. No.: 11/251,473

(22) Filed: Oct. 14, 2005

(65) Prior Publication Data

US 2006/0085746 A1 Apr. 20, 2006

(30) Foreign Application Priority Data

Oct. 15, 2004 (JP) ............................. 2004-302325

(51) Int. Cl.
*G06F 17/00* (2006.01)
(52) U.S. Cl. ..................................................... 715/208
(58) Field of Classification Search ................. 715/205, 715/206, 208, 255
See application file for complete search history.

(56) References Cited

U.S. PATENT DOCUMENTS

| 5,983,245 | A  | * | 11/1999 | Newman et al. | ............. | 715/205 |
| 6,581,061 | B2 | * | 6/2003  | Graham        | ........................ | 707/10 |
| 6,684,369 | B1 | * | 1/2004  | Bernardo et al. | ............. | 715/205 |
| 6,957,218 | B1 | * | 10/2005 | Wyatt         | ........................... | 707/10 |
| 7,287,227 | B2 | * | 10/2007 | Ries et al.   | .................... | 715/741 |
| 7,426,687 | B1 | * | 9/2008  | Schultz et al. | .............. | 715/208 |
| 7,624,342 | B2 | * | 11/2009 | Matveyenko et al. | ........ | 715/255 |
| 2001/0039594 | A1 | * | 11/2001 | Park et al. | .................. | 709/311 |
| 2002/0065920 | A1 | * | 5/2002  | Siegel et al. | ................ | 709/227 |
| 2002/0091736 | A1 | * | 7/2002  | Wall         | ........................... | 707/513 |
| 2003/0204811 | A1 | * | 10/2003 | Dam et al. | ................... | 715/500 |
| 2004/0143787 | A1 | * | 7/2004  | Grancharov et al. | ..... | 715/501.1 |
| 2004/0221231 | A1 | * | 11/2004 | Madril et al. | ............... | 715/527 |
| 2005/0015710 | A1 | * | 1/2005  | Williams    | ..................... | 715/500 |

(Continued)

FOREIGN PATENT DOCUMENTS

JP 9200076118 3/1990

(Continued)

OTHER PUBLICATIONS

Aoki et al., A Web Site Editing System based on Unfold/Fold Operations, Google 2002, pp. 1-20.*

(Continued)

*Primary Examiner*—Cong-Lac Huynh
(74) *Attorney, Agent, or Firm*—Dillon & Yudell LLP

(57) ABSTRACT

The present invention provides a web site editing method, a web site editing system, and a web site editing computer program product enabling both an improvement in efficiency and safety in editing partial sites. A method of editing a web site by using a plurality of editing environments including at least first and second editing environments, the web site being composed of a plurality of web pages and stored in the first editing environment, the method in the first editing environment having: a specification step of accepting that a user specifies a part of the plurality of web pages as a partial site; and a generation step of generating an editing file including a specific file, which corresponds to the web pages included in the partial site, and a common file potentially used for editing the partial site.

21 Claims, 15 Drawing Sheets

U.S. PATENT DOCUMENTS

| | | | |
|---|---|---|---|
| 2005/0021611 A1* | 1/2005 | Knapp et al. | 709/203 |
| 2005/0021862 A1* | 1/2005 | Schroeder et al. | 709/246 |
| 2006/0085492 A1* | 4/2006 | Singh et al. | 707/203 |
| 2006/0200751 A1* | 9/2006 | Underwood et al. | 715/501.1 |
| 2006/0212806 A1* | 9/2006 | Griffin et al. | 715/523 |
| 2007/0074111 A1* | 3/2007 | Firshein et al. | 715/530 |

FOREIGN PATENT DOCUMENTS

| | | |
|---|---|---|
| JP | 2000057373 | 2/2000 |
| JP | 2000076118 | 3/2000 |
| JP | 2002-278855 | 9/2002 |
| JP | 2003-030033 | 1/2003 |

OTHER PUBLICATIONS

Notification of Reasons for Rejection; File No. J9040164; 3 pages.

* cited by examiner

S1 DETAILED FLOW

S2 DETAILED FLOW

148(S1)

148(S1)

148(S2)

148(S4)

148(S4)

148(S5)

148(S5)

EDITING A WEB SITE USING A PLURALITY OF EDITING ENVIRONMENTS

FIELD OF THE INVENTION

The present invention relates to a web site editing technology, and more particularly to a technology preferable for creating, editing, and updating a web site in a plurality of editing environments.

BACKGROUND

Conventionally, web site editing, creating, and updating has been on the entire web site as a totality. This technique, however, does not consider the case where creating, editing, and updating a web site is performed in a plurality of editing environments. When allowing for a plurality of editing environments the following techniques have been adopted. A first method has been to create individual partial sites by dividing the entire web site and a second method has been to perform distributed development of a web site by using a source server or the like.

While a file distributed management system is disclosed in Japanese Laid-Open Patent Publication (Kokai) No. 2000-57373 and Japanese Laid-Open Patent Publication (Kokai) No. 2000-66118, these do not teach how to edit a web site in distributed environments without a source server.

Examples of a situation requiring creating, editing, and updating a web site in a plurality of editing environments are as follows: a company wants to entrust editing or other processing of a subsite of a certain department on the company's web site to the department concerned; a board of education wants to entrust editing or other processing of a subsite of each school association on the web site of the board of education to the school association concerned; and a school association wants to entrust editing or other processing of a subsite of each class on the web site of the school association to the class concerned. The aforementioned first and second methods, however, cannot always fully satisfy a user's request.

In the first method, the files of the entire site are not locally owned in individual editing environments. Therefore, a user cannot use, for example, a link to a subsite of another department or an image used throughout the entire site (for example, a logo image of a company name) in an editing environment of a partial site. On the other hand, in the second method, the files of the entire site are locally owned in individual editing environments. Therefore, a user can easily use a link to a subsite of another department or an image used throughout the entire site. There is, however, a potential for the user to edit or delete the link to the subsite of another department or the image used throughout the entire site by mistake.

In view of these technical problems, the present invention has been provided. Therefore, it is an object of the present invention to provide a web site editing method, a web site editing system, and a web site editing program enabling both an improvement in efficiency and safety of editing partial sites.

SUMMARY OF THE INVENTION

The present invention is directed to a web site editing method as described below. Specifically, it is an editing method of editing a web site by using a plurality of editing environments including at least first and second editing environments, the web site being composed of a plurality of web pages and stored in the first editing environment, the method in the first editing environment comprising: a specification step of accepting that a user specifies a part of the plurality of web pages as a partial site; and a generation step of generating an editing file including a specific file, which corresponds to the web pages included in the partial site, and a common file potentially used for editing the partial site. Furthermore, it can be an editing method further comprising an export step of exporting the editing file generated in the generation step from the first editing environment to the second editing environment. Still further, it can be an editing method further comprising an editing step of accepting that the user edits the editing file exported in the export step in the second editing environment. Still further, it can be an editing method further comprising a display step of displaying the partial site on the basis of the editing file edited in the editing step in the second editing environment. Furthermore, it can be an editing method further comprising: an import step of importing the editing file edited in the editing step from the second editing environment to the first editing environment; and a rebuilding step of rebuilding the web site on the basis of the editing file imported in the import step in the first editing environment.

Moreover, the present invention is directed to a web site editing system as described below. Specifically, it is a first editing system for editing a web site, comprising: storage means for storing the web site composed of a plurality of web pages; specification means for accepting that a user specifies a part of the plurality of web pages as a partial site; and generation means for generating an editing file including a specific file, which corresponds to the web pages included in the partial site, and a common file potentially used for editing the partial site. Furthermore, it can be an editing system further comprising export means for exporting the editing file generated by the generation means from the editing system to another editing system. The present invention can also be an (second) editing system for editing a web site, wherein: the web site is composed of a plurality of web pages; a part of the plurality of web pages is considered a partial site; and an editing file includes a specific file corresponding to the web pages included in the partial site and a common file potentially used for editing the partial site, the system comprising: input means for accepting an export of the editing file from another editing system; and editing means for accepting that a user edits the editing file exported by the input means. Moreover, it can be an editing system wherein the editing means accepts that the user edits the specific file and rejects that the user edits the common file. Furthermore, it can be an editing system further comprising display means for displaying the partial site on the basis of the editing file edited by the editing means. Still further, it can be an editing system further comprising import means for importing the editing file edited by the editing means from the editing system to another editing system.

The present invention is also directed to a web site editing computer program product as described below. Specifically, it is a computer program for causing a computer to function as a first editing system for editing a web site, the computer program causing the computer to perform: a storage function of storing the web site composed of a plurality of web pages; a specification function of accepting that a user specifies a part of the plurality of web pages as a partial site; and a generation function of generating an editing file including a specific file, which corresponds to the web pages included in the partial site, and a common file potentially used for editing the partial site. Furthermore, it can be a program for causing the computer to perform an export function of exporting the editing file generated by the generation function from the editing system to another editing system. Moreover, it can be a computer program for causing a computer to function as an (second) editing system for editing a web site, wherein: the web site is composed of a plurality of web pages; a part of the plurality of web pages is considered a partial site; and an editing file includes a specific file, which corresponds to the web pages included in the partial site, and a common file potentially used for editing the partial site, the program causing the computer to perform: an input function of accepting an export of the editing file from another editing system; and an editing function of accepting that a user edits the editing file exported by the input function. Furthermore, it can be a program wherein the editing function includes accepting that the user edits the specific file and rejecting that the user edits the common file. Still further, it can be a program for causing the computer to perform a display function of displaying the partial site on the basis of the editing file edited by the editing function. Furthermore, it can be a program for causing the computer to perform an import function of importing the editing file edited by the editing function from the editing system to another editing system.

According to the present invention, it is possible to provide a web site editing method, a web site editing system, and a web site editing computer program product enabling both an improvement in efficiency and safety in editing partial sites.

DETAILED DESCRIPTION

Figure 1:
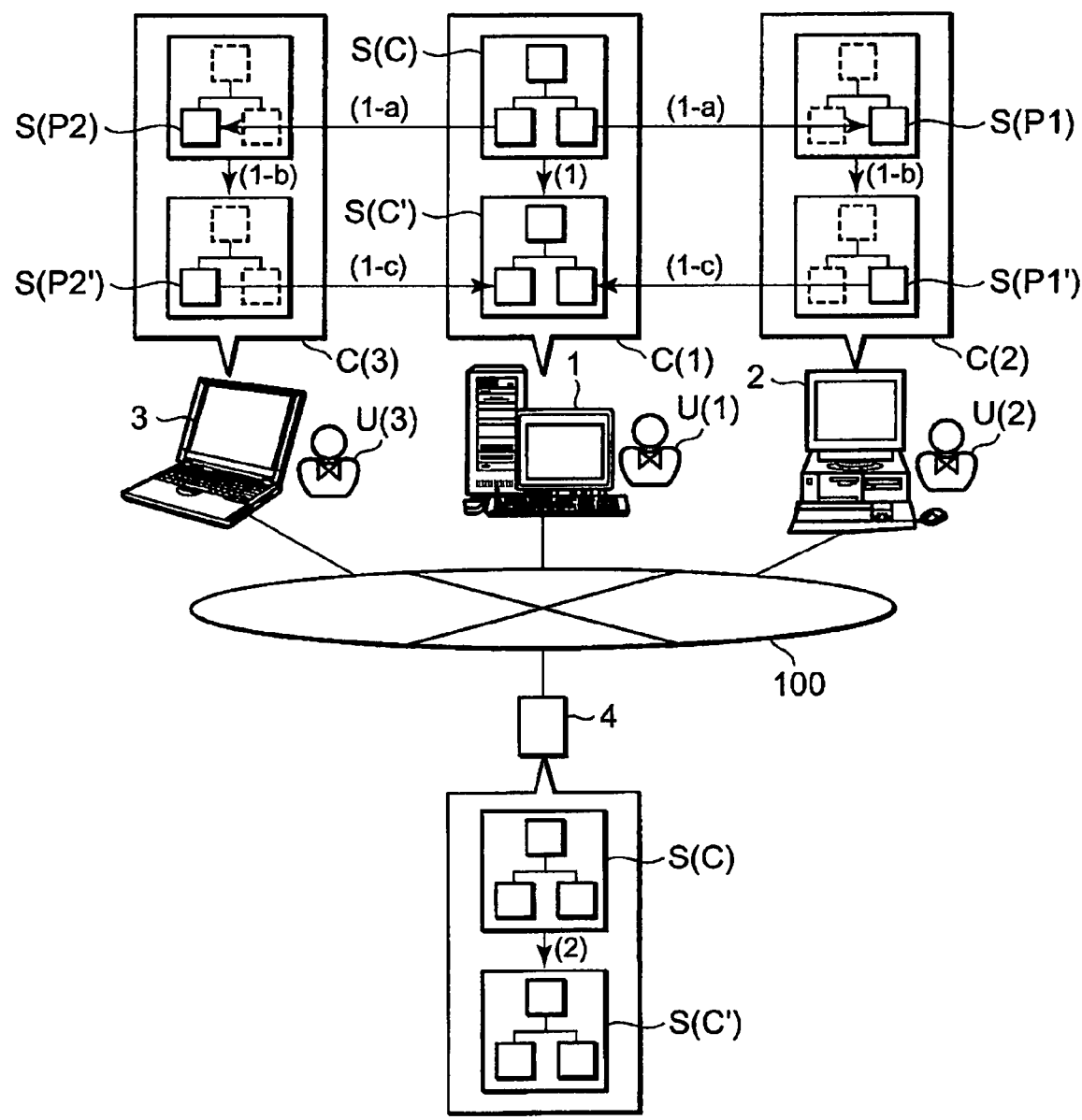
FIG. 1 is a schematic view of an editing system according to a first embodiment.

Referring to FIG. 1, there is shown a schematic view of a network editing system to which the present invention is applicable. The network editing system comprises an information communication network 100, first to third computer systems 1 to 3 connected to the network, and a web server 4.

Note here that the information communication network 100 embodies a concept containing the Internet, an intranet, and an extranet. Therefore, first to third users U(1) to U(3) using these computer systems can create, edit, and update a web site in association with each other, across organizations which they belong to or independently of where or when they are working.

In this embodiment, it is assumed that the user U(1) is a web master of an organization, the user U(2) is a web master of a subordinate organization A belonging to the organization, and the user U(3) is a web master of a subordinate organization B belonging to the organization. A first computer system (a first editing system) 1 provides the user U(1) with a first editing environment C(1) for creating, editing, and updating an entire web site S(C) of the organization. A second computer system (a second editing system) 2 provides the user U(2) with a second editing environment C(2) for editing or otherwise processing a web site (a partial site composed of one or more web pages) S(P1) of the subordinate organization A forming a part of the entire web site S(C). Furthermore, a third computer system (a third editing system) 3 provides the user U(3) with a third editing environment C(3) for editing or otherwise processing a web site (a partial site composed of one or more web pages) S(P2) of the subordinate organization B forming a part of the entire web site S(C). In this embodiment, the computer systems 1 to 3 provide the editing environments C(1) to C(3), respectively, in this manner. The present invention, however, is not limited to this structure, a single computer system can provide a plurality of editing environments (without the information communication network 100). For example, the computer system 2 can provide the user U(2) with the second editing environment C(2) and the user U(3) with the third editing environment C(3) on the basis of user authentication performed at their login processing. In addition, the present invention is not limited to three computers and users, but can comprise any number of single or multi-user computers.

Moreover, in this embodiment, the user U(1) uploads the web site S(C) stored in the first computer system 1 onto the web server 4 via the information communication network 100, whereby the web site S(C) is widely open to the public.

Figure 2:
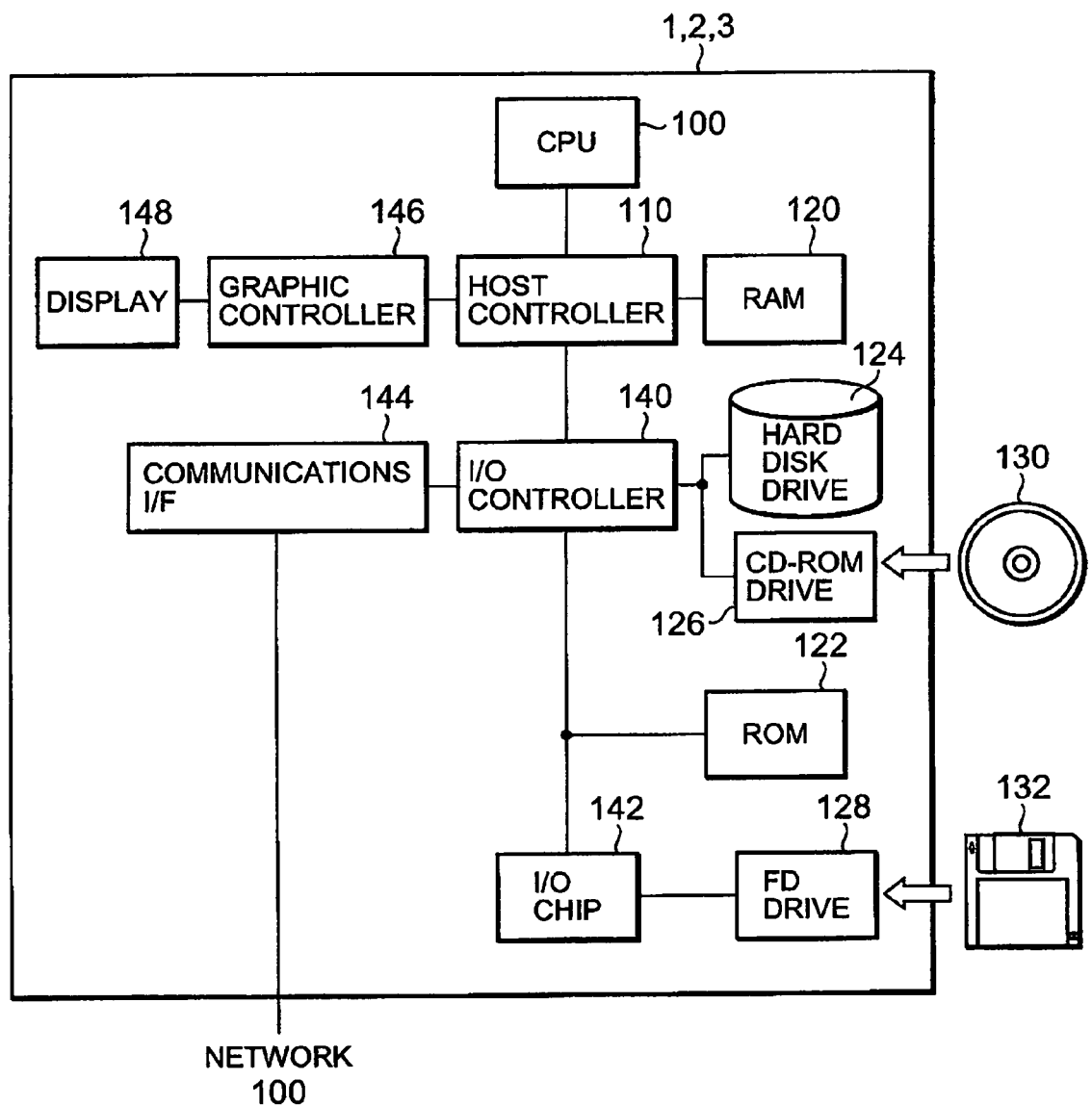
FIG. 2 is a hardware configuration diagram of each computer system.

Referring to FIG. 2, there is shown a schematic view illustrating a preference hardware configuration of each of the computer systems 1 to 3. Each of the computer systems 1 to 3 comprises: a CPU peripheral section including a CPU 100, a RAM 120, and a graphic controller 146 connected to each other via a host controller 110; an input/output section having a communication interface 144 connected to the host controller 110 via an input/output controller 140, a hard disk drive 124, and a CD-ROM drive 126; and a legacy input/output section (flexible disk drive 128 or the like) having a ROM 122 and an input/output chip 142 connected to the input/output controller 140.

The host controller 110 connects the RAM 120 to the CPU 100 and the graphic controller 146, which access the RAM 120 at a high transfer rate. The CPU 100 operates on the basis of a program stored in the ROM 122 and the RAM 120 and controls respective parts. The graphic controller 146 acquires image data generated by the CPU 100 or the like onto a frame buffer provided in the RAM 120 and displays it on a display device 148. Alternatively, the graphic controller 146 can include a frame buffer for storing the image data generated by the CPU 100 or the like.

The input/output controller 140 connects the host controller 110 to the communication interface 144, the hard disk drive 124, and the CD-ROM drive 126, which are relatively fast input/output devices. The communication interface 144 communicates with other devices via a network. The hard disk drive 124 stores programs and data used by the computer. The CD-ROM drive 126 reads a program or data from the CD-ROM 130 and provides it to the input/output chip 142 via the RAM 120.

Moreover, the input/output controller 140 is connected to the ROM 122, the input/output chip 142, or other relatively slow input/output devices (for example, the flexible disk drive 128). The ROM 122 stores a boot program executed by the CPU 100 at a startup of the computer or other programs dependent on computer hardware. The flexible disk drive 128 reads a program or data from the flexible disk 132 and provides it to the input/output chip 142 via the RAM 120. The input/output chip 142 connects the flexible disk drive 128 or other various input/output devices via, for example, a parallel port, a serial port, a keyboard port, a mouse port, or the like.

Subsequently, a software configuration of the respective computer systems 1 to 3 will be described below. The computer systems are provided with computer programs (an operating system and an application program), which have been stored in a recording medium such as the flexible disk 132, the CD-ROM 130, a DVD-ROM, or an IC card or acquired by a user via a network. The programs are read from the recording medium and installed into the computer via the input/output chip 142 or is read from another computer on the network and installed into the computer via the communication interface 144, and then executed by the computer.

At this point, a web site editing program is installed as an application program into the computer systems 1 to 3. While identical web site editing programs are installed into the computer systems 1 to 3 in this embodiment, different web site editing programs can be installed into them. For example, an editing program exclusively for the entire web site can be installed into the computer system 1 and an editing program exclusively for partial web sites can be installed into the computer systems 2 and 3.

With the hardware configuration and the software configuration combined with each other, the computer systems 1 to 3 perform the functions described below.

Figure 3:
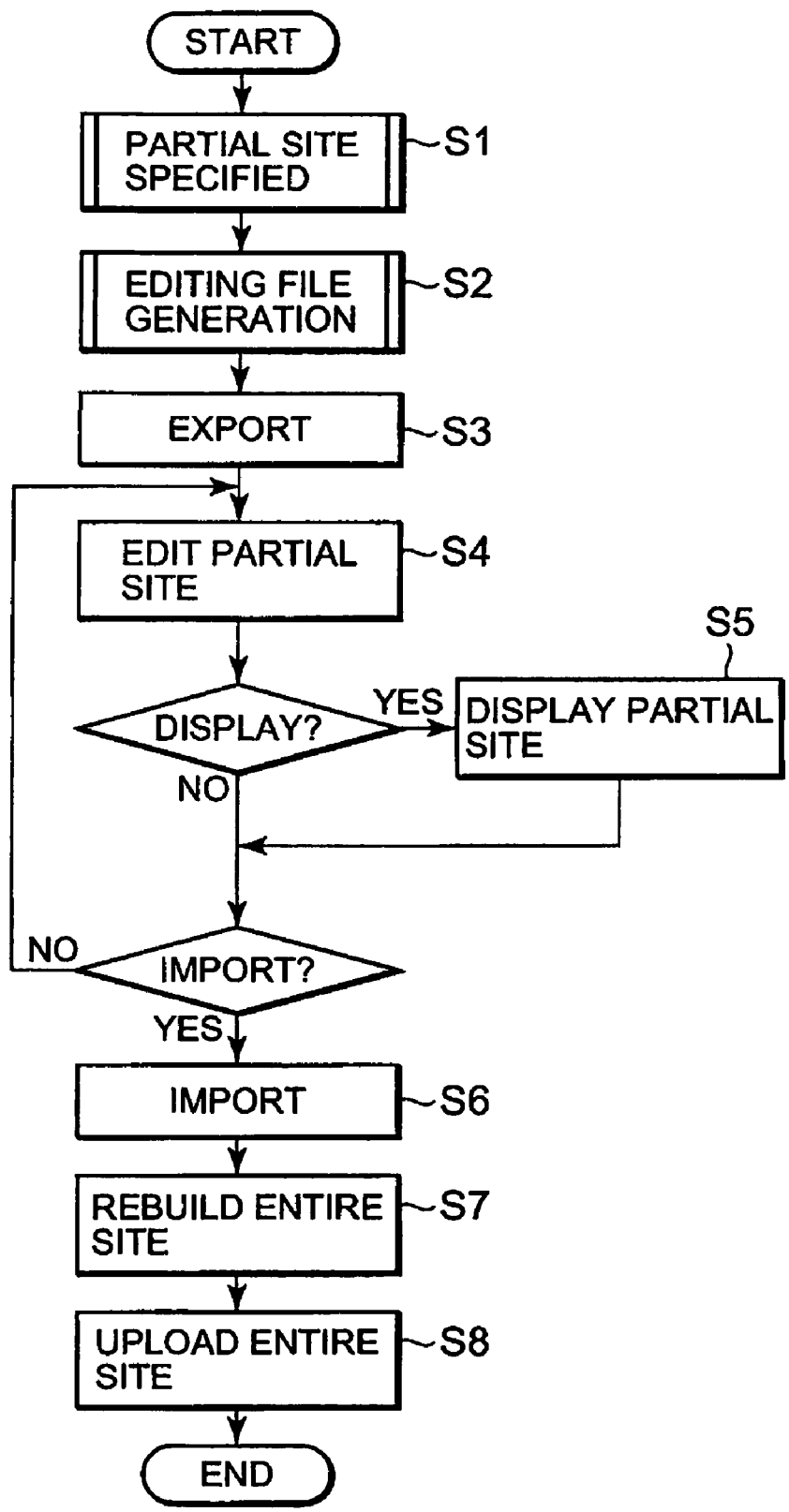
FIG. 3 is a flowchart showing the basic operation of the editing system according to the first embodiment.
Figure 4:
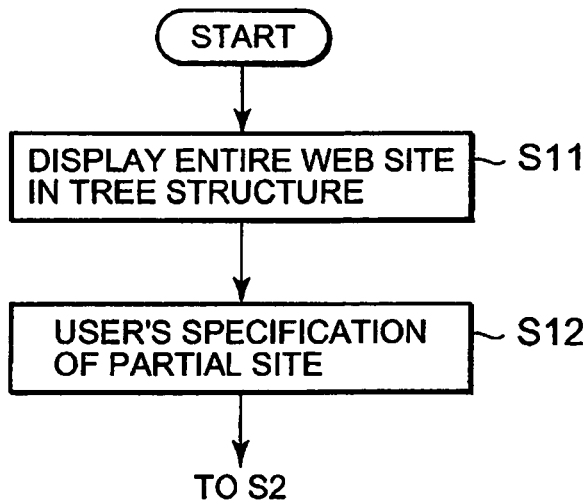
FIG. 4 is a flowchart illustrating step S1 in FIG. 3 in more detail.
Figure 5:
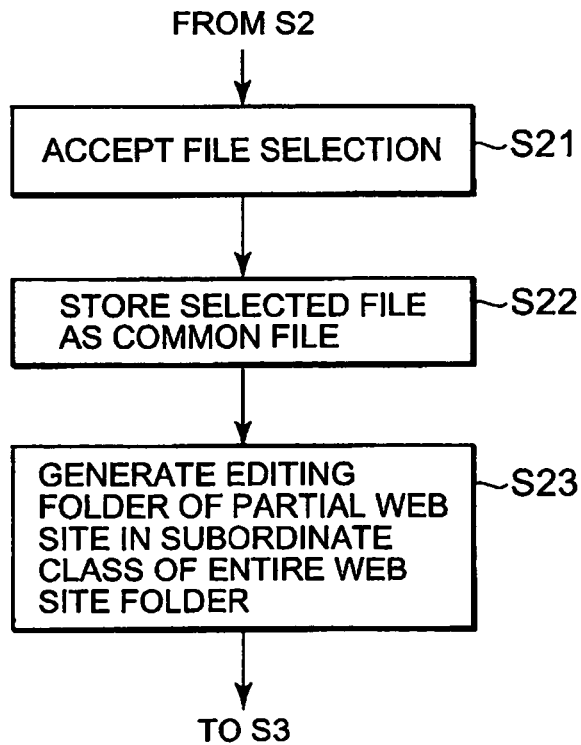
FIG. 5 is a flowchart illustrating step S2 in FIG. 3 in more detail.

Referring to FIG. 3, there is shown a flowchart illustrating the basic operation of the network editing system according to this embodiment. Referring to FIG. 4, there is shown a flowchart illustrating the operation in step S1 of the flowchart in FIG. 3 in more detail. Referring to FIG. 5, there is shown a flowchart illustrating the operation in step S2 of the flowchart in FIG. 3 in more detail. FIGS. 6 to 13 illustrate display screens of the display device 148 of the computer systems 1 to 3. Hereinafter, the operation of the network editing system according to this embodiment will be described on the basis of these flowcharts and the display screens.

In step S1 shown in FIG. 3, the user U(1) specifies a partial site S(P) from the entire web site S(C) in the first editing environment C(1), namely the first computer system 1 in this embodiment. In step S1, more specifically, with the structure of the entire web site S(C) displayed in the form of a tree structure (step S11 in FIG. 4), the user U(1) specifies the partial site S(P) by operating a mouse or the like from the entire web site S(C) in the tree structure (step S12 in FIG. 4). In this embodiment, the user U(1) specifies a partial site S(P1) edited in the second editing environment C(2) or the second computer system 2 and a partial site S(P2) edited in the third editing environment C(3) or the third computer system 3. Since the works and operations in the second editing environment are substantially equivalent to those in the third editing environment C(3), the following description is given regarding the works and operations in the second editing environment C(2) only.

Figure 6:
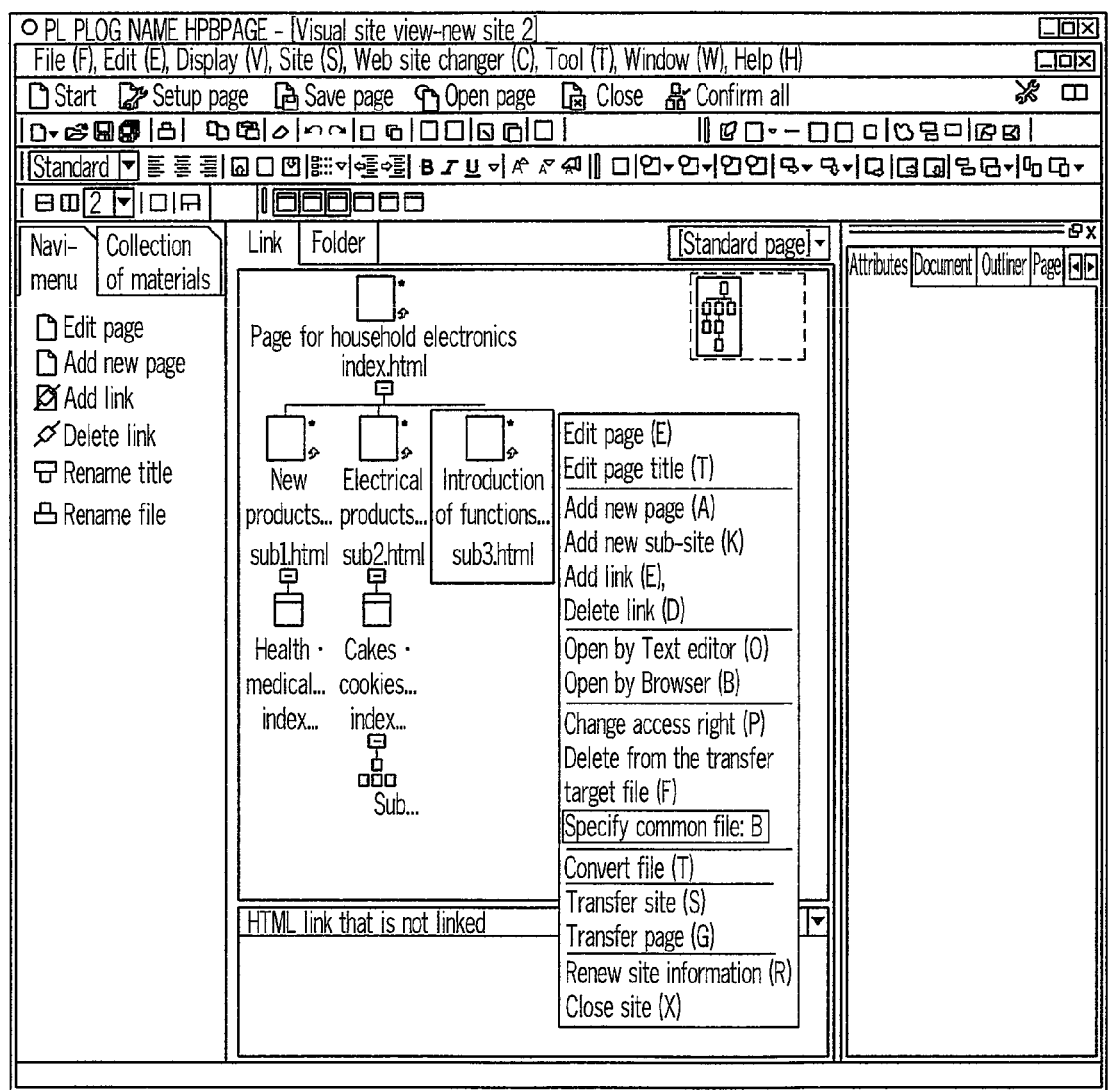
FIG. 6 is an example of a display screen of the computer system.

Referring to FIG. 6, there is shown a display screen 148 (S1) of the first computer system 1 in step S1. In the center of the display screen 148(S1), the structure of the entire web site S(C) is displayed in the form of a tree structure. If the user U(1) right-clicks (or otherwise signals) on an object (a web page in this case) forming a part of the entire web site S(C), the shown pop-up menu group appears. If the user U(1) selects "Specify as Common File" on the menu group, the object is specified as a common file.

Figure 7:
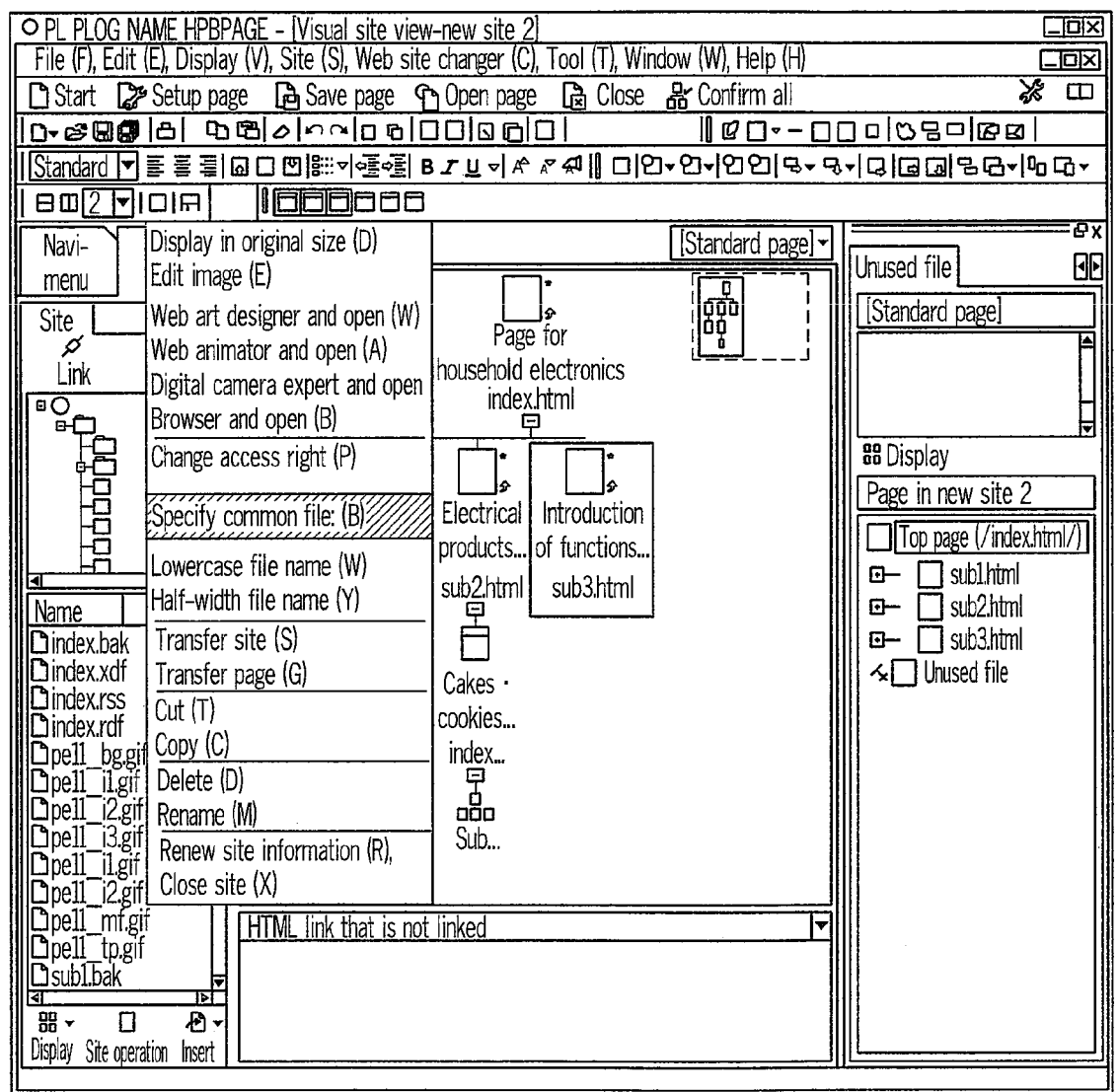
FIG. 7 is an example of a display screen of the computer system.

Referring to FIG. 7, there is shown another display screen 148(S1) of the first computer system 1 in step S1. In the lower left corner of the display screen 148(S1), web materials included in the entire web site S(C) are displayed in the form of files. If the user right-clicks on an object (a GIF file as a web material in this case) forming a part of the entire web site S(C), the shown pop-up menu group appears. If the user U(1) selects "Specify as Common File" on the menu group, the object is specified as a common file.

In step S2 shown in FIG. 3, the first computer system 1 creates an editing file (a first editing file) for the partial site S(P1). This editing file includes a specific file corresponding to the web page group included in the partial site S(P1) specified in step S1 and a common file potentially used for editing the partial site S(P1). This common file is related to other web pages (corresponding to the entire web site S(C) and the partial web site S(P2)) not included in the partial web site S(P1). More specifically, the common file includes web materials (static images, voice, moving images, scripts, style sheets, and the like) of other web pages and link information indicating link destinations.

In this step S2, more specifically, it is accepted that the user U(1) selects a file to be specified as a common file (step S21 in FIG. 5), stores the file selected by the user U(1) (step S22 in FIG. 5), and creates an editing folder of the partial web site S(P1) in a subordinate class of the folder of the entire web site S(C) in the computer system 1 (step S23 in FIG. 5).

Figure 8:
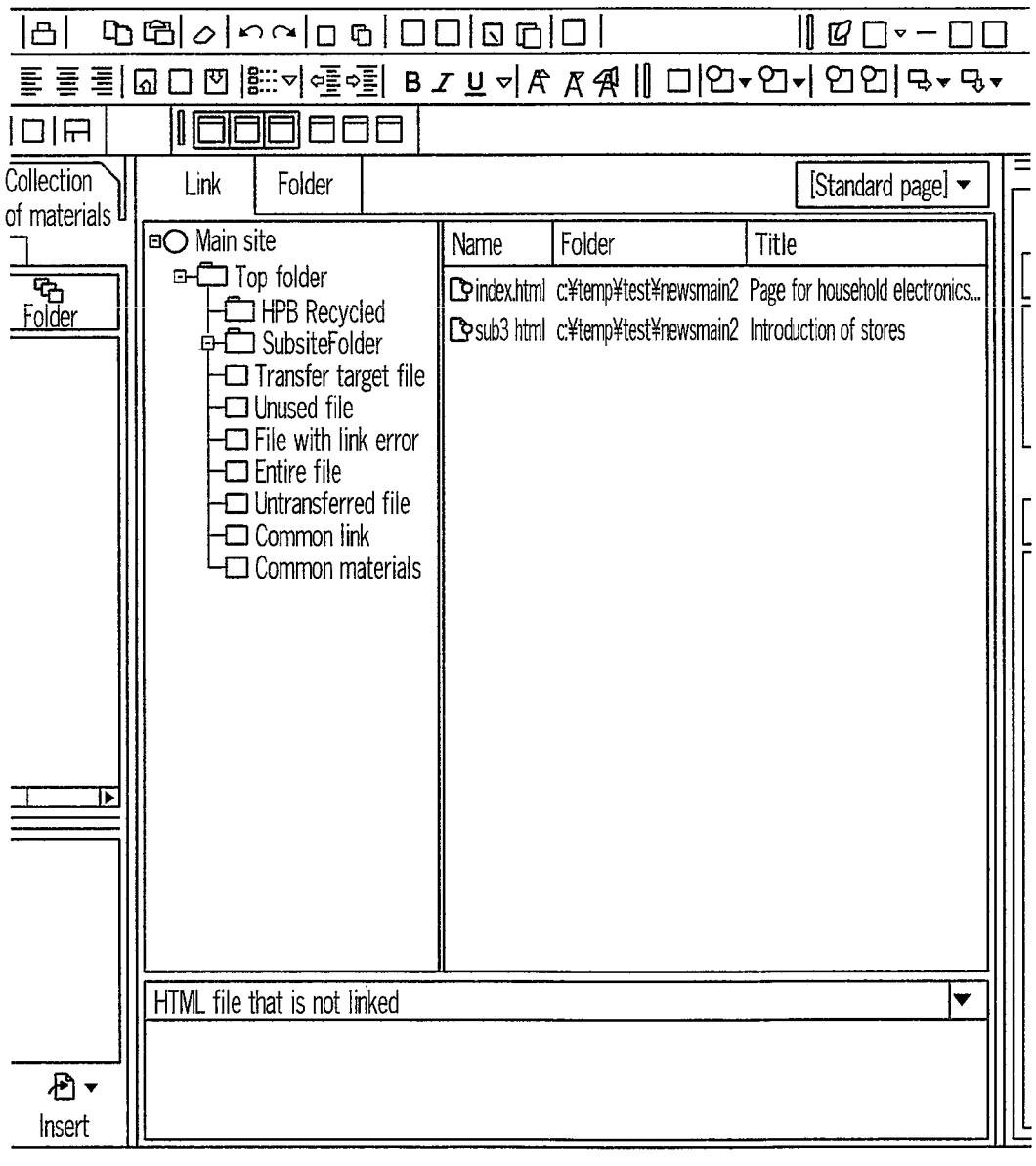
FIG. 8 is an example of a display screen of the computer system.

Referring to FIG. 8, there is shown another display screen 148(S2) of the first computer system 1 in step S2. In the center of the display screen 148(S2), there are displayed the files constituting the entire web site S(C). Folder "SubSiteFolder" containing editing files is created in a subordinate class of the folder "Top Folder" containing the files constituting the entire web site S(C). Furthermore, the folder "SubSiteFolder" contains html files (link information) as common files.

In step S3 shown in FIG. 3, the first editing file is exported from the first editing environment C(1) to the second editing environment C(2), in other words, from the first computer system 1 to the second computer system 2 (See an arrow (1-*a*) in FIG. 1). In this embodiment, the first editing file is exported as an attached file of an e-mail from the first computer system 1 to the second computer system 2. Exporting an editing file by bypassing the information communication network 100 will be described in a second embodiment.

In step S4 shown in FIG. 3, the partial web site S(P1) is edited in the second editing environment C(2) or the second computer system 2 (See an arrow (1-*b*) in FIG. 1). Specifically, the user U(2) edits a specific file by using and referencing a common file of the editing files. In this regard, while modifying or deleting the specific file is permitted in the second computer system 2, modifying or deleting the common file is not permitted. For example, if the common file includes link information, it is permitted to paste the link information to the specific file corresponding to the partial web site S(P1), but the link information itself is not permitted to be modified nor deleted.

Figure 9:
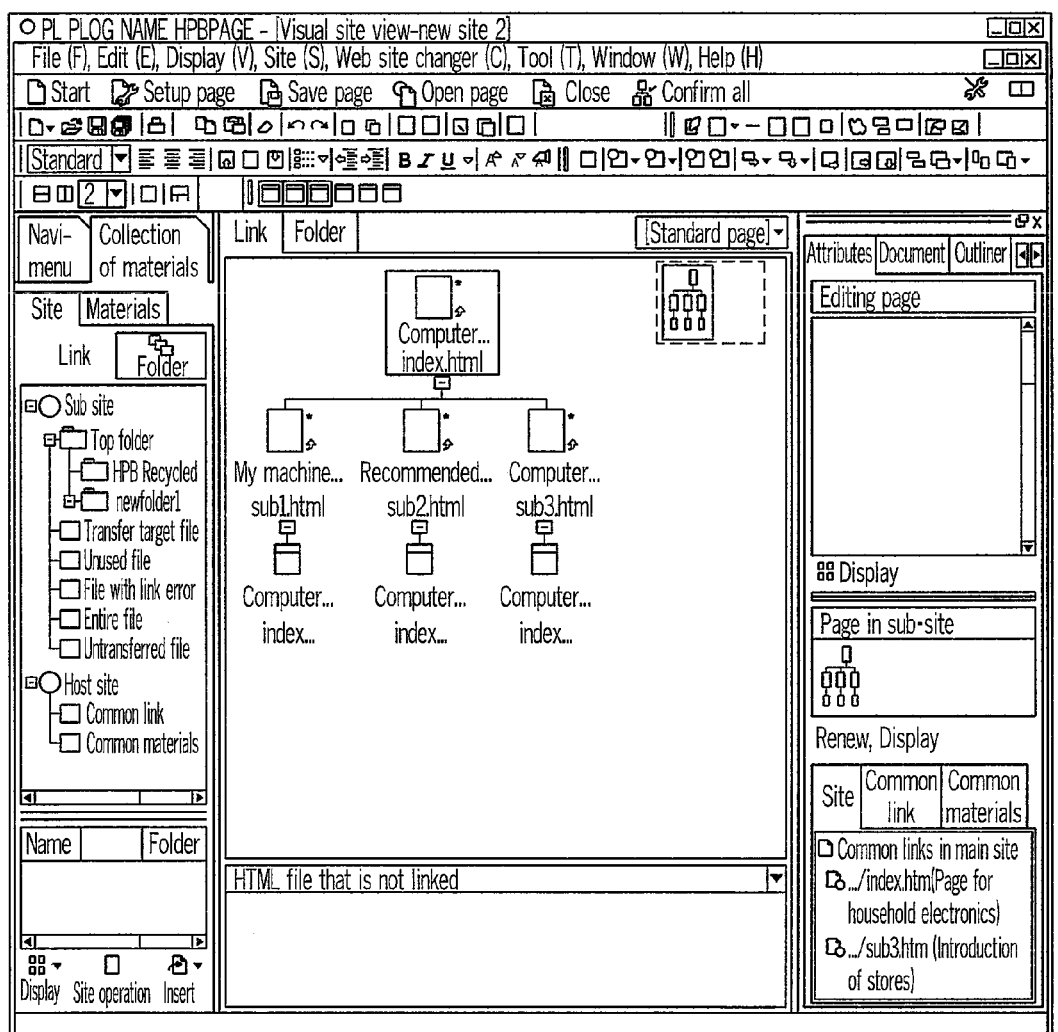
FIG. 9 is an example of a display screen of the computer system.

Referring to FIG. 9, there is shown a display screen 148 (S4) of the second computer system 2 (the third computer system 3) in step S4. There are displayed files of link information (displayed as "Common Link" here) and web materials (displayed as "Common Material" here) included in the entire web site (displayed as "Host Site" here) S(C) on the left side of the display screen 148(S4). Furthermore, link information as common files is displayed in the lower right corner of the display screen 148(S4) and the partial web site S(P) can be edited by using the link information.

Figure 10:
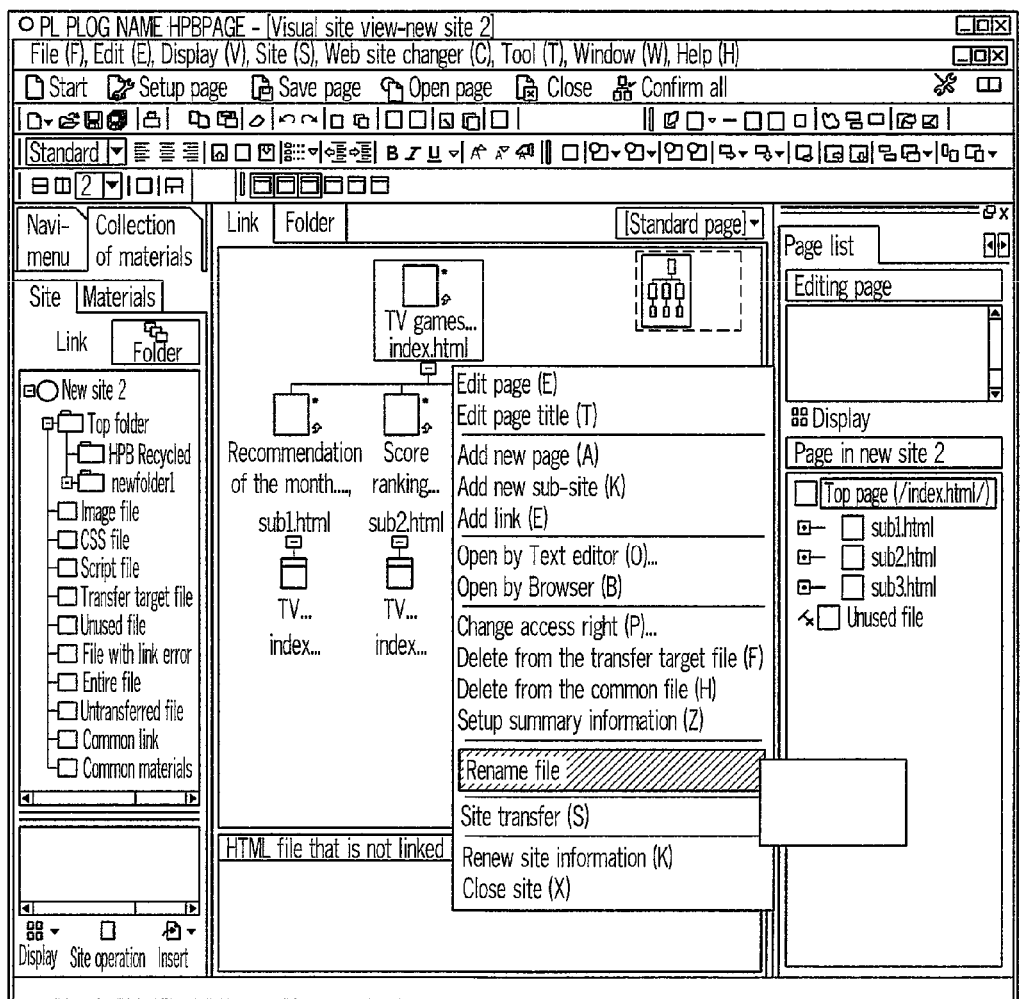
FIG. 10 is an example of a display screen of the computer system.

Referring to FIG. 10, there is shown still another display screen 148(S4) of the second computer system 2 (the third computer system 3) in step S4. In the center of the display screen 148(S4), the structure of the partial web site S(P1) is displayed in the form of a tree structure. If the user U(2) right-clicks on an object (in this case, a common file) forming a part of the tree structure, the pop-up menu group appears. Option "Rename File" on the menu group is grayed out, whereby the user U(2) cannot select it to change the file name of the common file.

Figure 11:
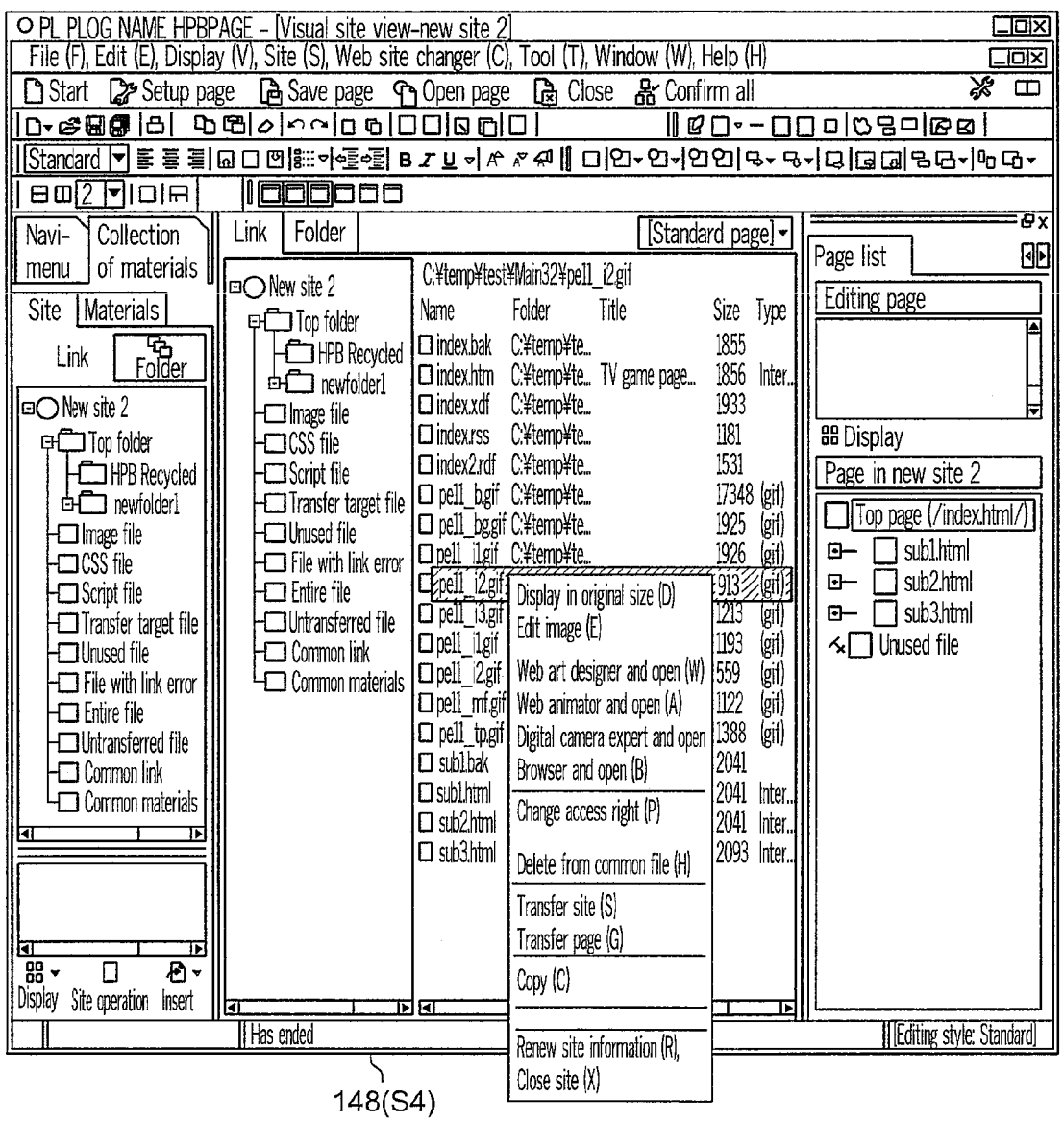
FIG. 11 is an example of a display screen of the computer system.

Referring to FIG. 11, there is shown still another display screen 148(S4) of the second computer system 2 (the third computer system 3) in step S4. In the center of the display screen 148(S4), common files are displayed in the form of files. If the user U(2) right-clicks on an object (in this case, a web material) forming a part of the common files, the shown pop-up menu group appears. Options "Change File Name" and "Delete File" on the menu group are either not displayed (or alternatively grayed out), whereby the user U(2) cannot select them to change the file name of the common file or to delete the file.

In step S5 shown in FIG. 3, the partial web site S(P1) after the completion or in the process of editing is displayed in the second editing environment C(2) (or the second computer system 2). If the common file includes relative path information in the first editing environment C(1) (or the first computer system 1) to a web material (for example, a static image) of another web page and meta information of the web material her; and the relative path information and the meta information are added to a specific file in editing step S4, the web material is displayed on the basis of the meta information in the display step S5. For example, the static image is replaced with a dummy image on the display. If the common file includes actual information of a web material of another web page and the actual information is added to the specific file in the editing step S4, the web material is displayed on the basis of the actual information in the display step S5. For example, a static image is displayed as it is on the basis of the actual information in the second computer system 2. Furthermore, if the entire web site S(C) is uploaded to the web server 4 on the information communication network 100, the common file includes absolute path information in the information communication network 100 to a web material (for example, a static image) of another web page, and the absolute path information is added to the specific file in the editing step S4, actual information on the web server 4 of the web material is acquired on the basis of the absolute path information and the web material is displayed on the basis of the actual information in the display step S5. For example, the static image is displayed as it is on the basis of the actual information in the web server 4.

Figure 12:
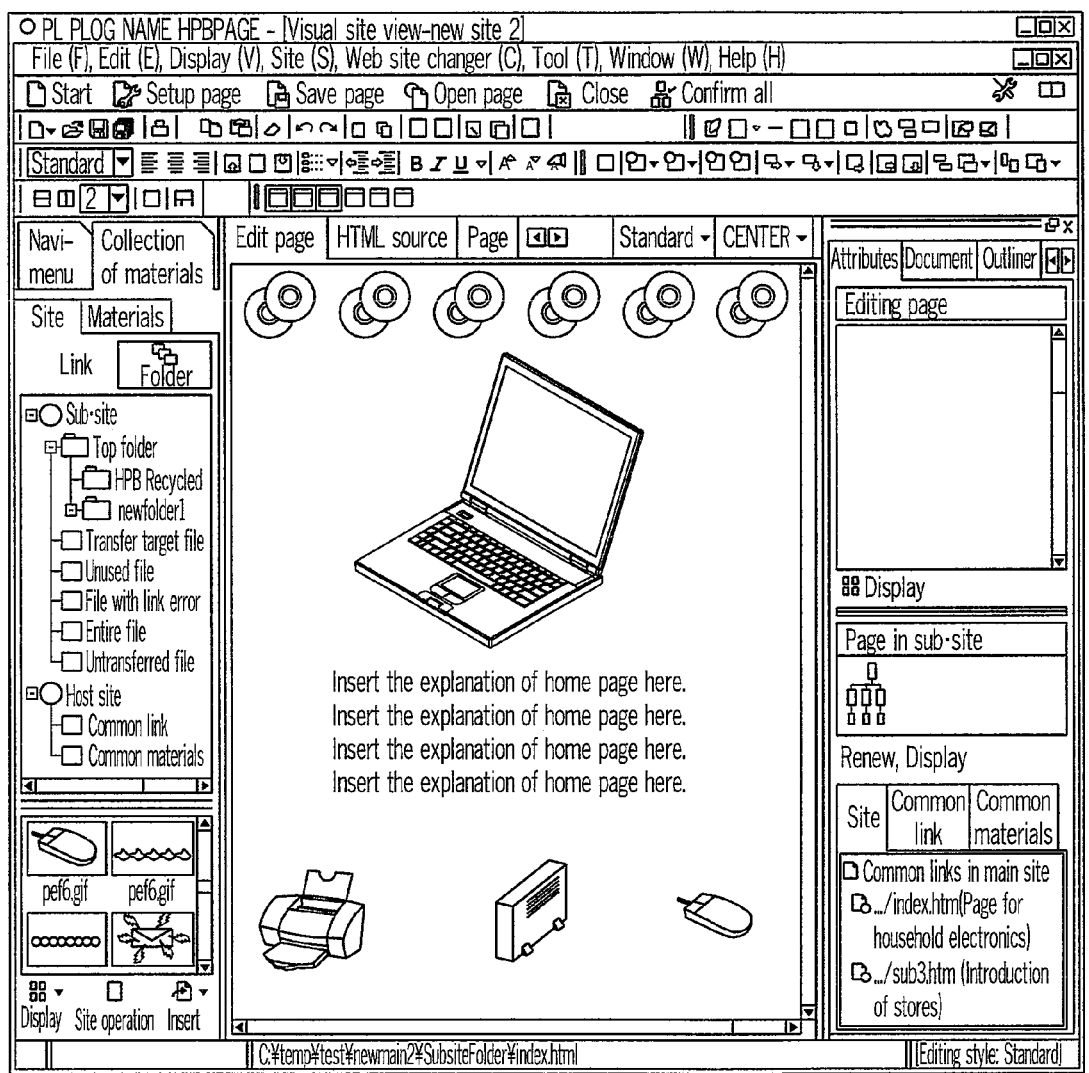
FIG. 12 is an example of a display screen of the computer system.

Referring to FIG. 12, there is shown a display screen 148 (S5) of the second computer system 2 (the third computer system 3) in step S5. In the center of the display screen 148(S5), a partial web site S(P) is displayed. Objects forming a part of the partial web site S(P) (in this case, static images of a notebook computer, a printer, an external hard disk drive, and a mouse as web materials) belong to the second editing environment C(2) as common files and are displayed on the basis of, for example, actual information.

Figure 13:
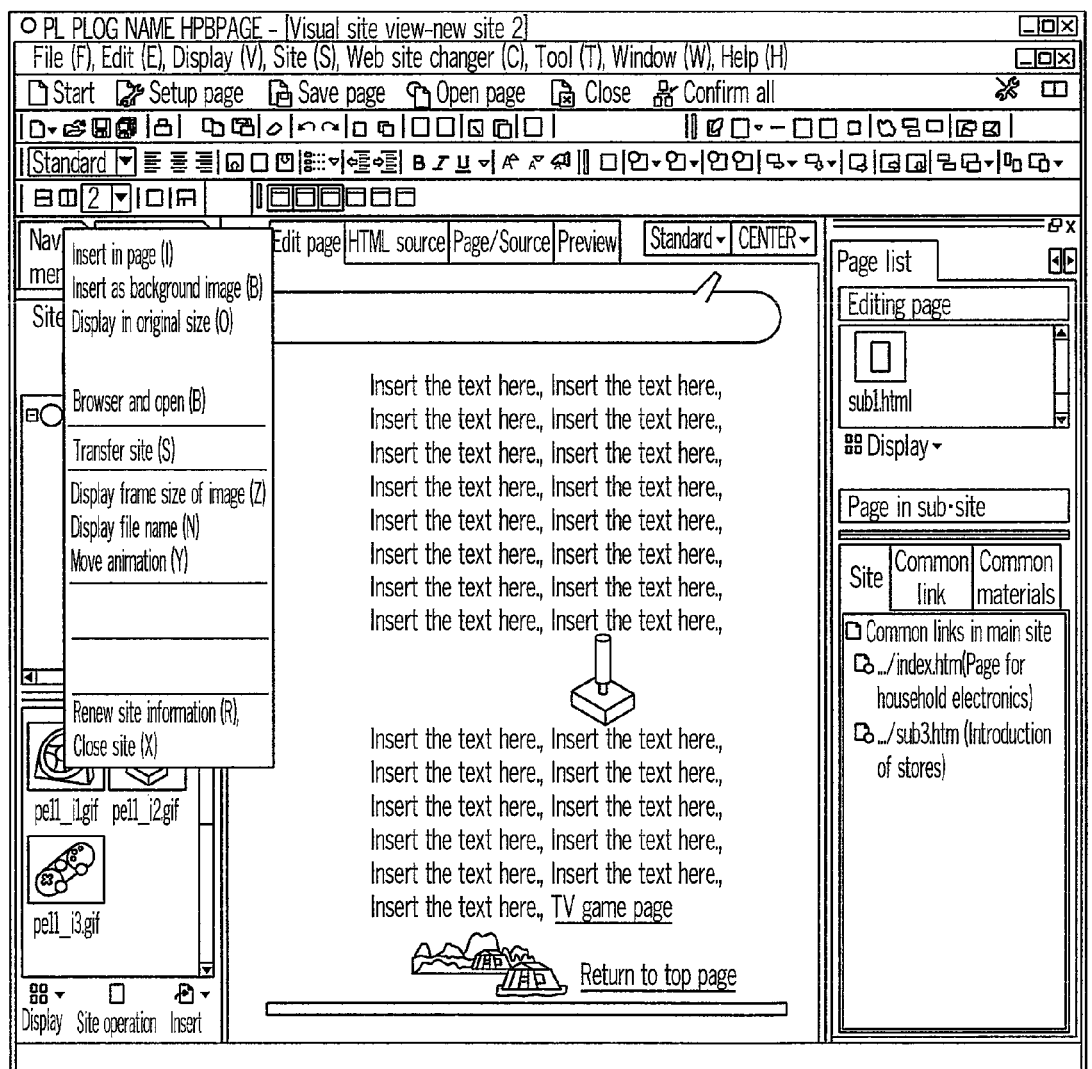
FIG. 13 is an example of a display screen of the computer system.

Referring to FIG. 13, there is shown another display screen 148(S5) of the second computer system 2 (the third computer system 3) in step S5. In the center of the display screen 148(S5), a partial web site S(P) is displayed. If the user U(2) right-clicks on an object forming a part of the partial web site S(P), the shown pop-up menu group appears. As shown, also in the display step S5, options "Change File name" and "Delete File" on the menu group are not displayed (or alternatively, grayed out), whereby the user U(2) cannot select them to change the file name of a common file or to delete the file.

In step S6 shown in FIG. 3, the first editing file is imported from the second editing environment C(2) to the first editing environment C(1), in other words, from the second computer system 2 to the first computer system 1 (see an arrow (1-c) in FIG. 1). In this embodiment, the first editing file is imported as an attached file of an e-mail from the second computer system 2 to the first computer system 1. Importing an editing file by bypassing the information communication network 100 will be described in a second embodiment.

In step S7 shown in FIG. 3, an entire web site S(C') is rebuilt on the basis of the imported partial web sites S(P1') and S(P2') in the first editing environment C(1) or the first computer system 1 (See an arrow (1) in FIG. 1). In step S8 shown in FIG. 3, the rebuilt entire web site S(C') is uploaded onto the web server 4 via the information communication network 100 (See an arrow (2) in FIG. 1). As a consequence, the rebuilt entire web site S(C') is widely opened to the public.

According to this network editing system, a user can efficiently edit a web site. Specifically, the user can use a common file when editing a partial web site and thus can edit the partial web site by using resources not included in the partial web site. Moreover, according to the network editing system, the user can safely edit the web site. Specifically, the user need not export all files of the entire web site and is inhibited from modifying or deleting common files, whereby there is no possibility that the entire web site loses the transparency or commonality when the partial web site is recombined with the entire web site.

Figure 14:
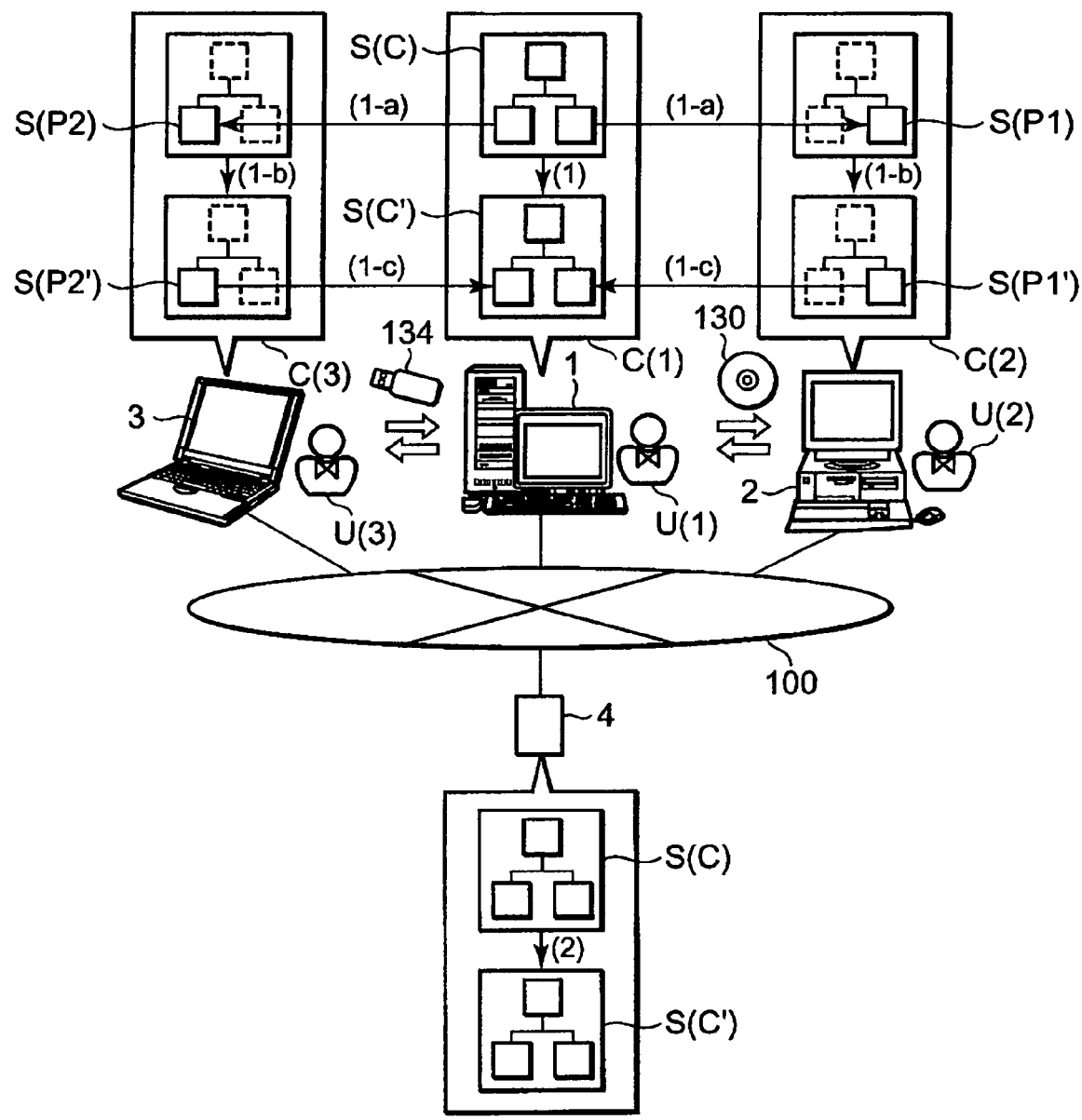
FIG. 14 is a schematic view of an editing system according to a second embodiment.

Referring to FIG. 14, there is shown a schematic view of a network editing system according to a second embodiment. In this network editing system, exporting (See step S3 in FIG. 3 and the arrow (1-a) in FIG. 1) and importing (See step S6 in FIG. 3 and the arrow (1-c) in FIG. 1) of an editing file are not carried out via an information communication network 100, unlike the first embodiment. The same references have been used as in the first embodiment for similar parts and their description is omitted here.

In this embodiment, both of a first computer system 1 and a second computer system 2 are standalone computer terminals, both of which are not connected to the information communication network 100. In this embodiment, a generated editing file (step S2 in FIG. 3) is stored into an information storage medium such as, for example, a CD-R 130 or a USB memory 134, exported from the first computer system 1 to the second computer system 2 (a third computer system 3), and imported from the second computer system (the third computer system 3) to the first computer system.

Figure 15:
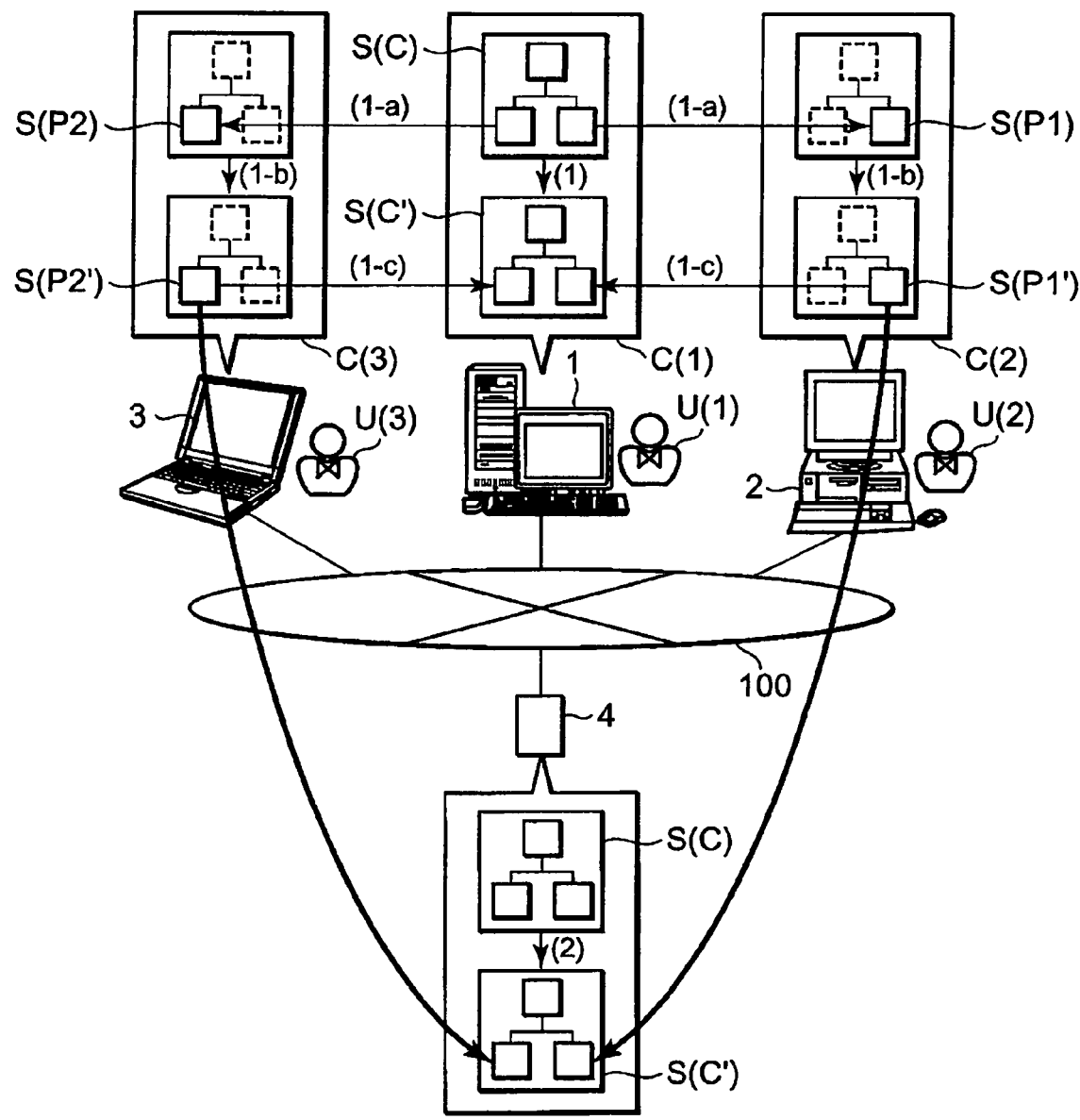
FIG. 15 is a schematic view of an editing system according to a third embodiment.

Referring to FIG. 15, there is shown a schematic view of a network editing system according to a third embodiment. In this network editing system, an already edited partial web site S(P') is uploaded from a second editing environment (a second computer system 2) or a third editing environment (a third computer system 3) directly to a web server 4, unlike the first embodiment. The same references have been used as in the first embodiment for similar parts and their description is omitted here.

Figure 16:
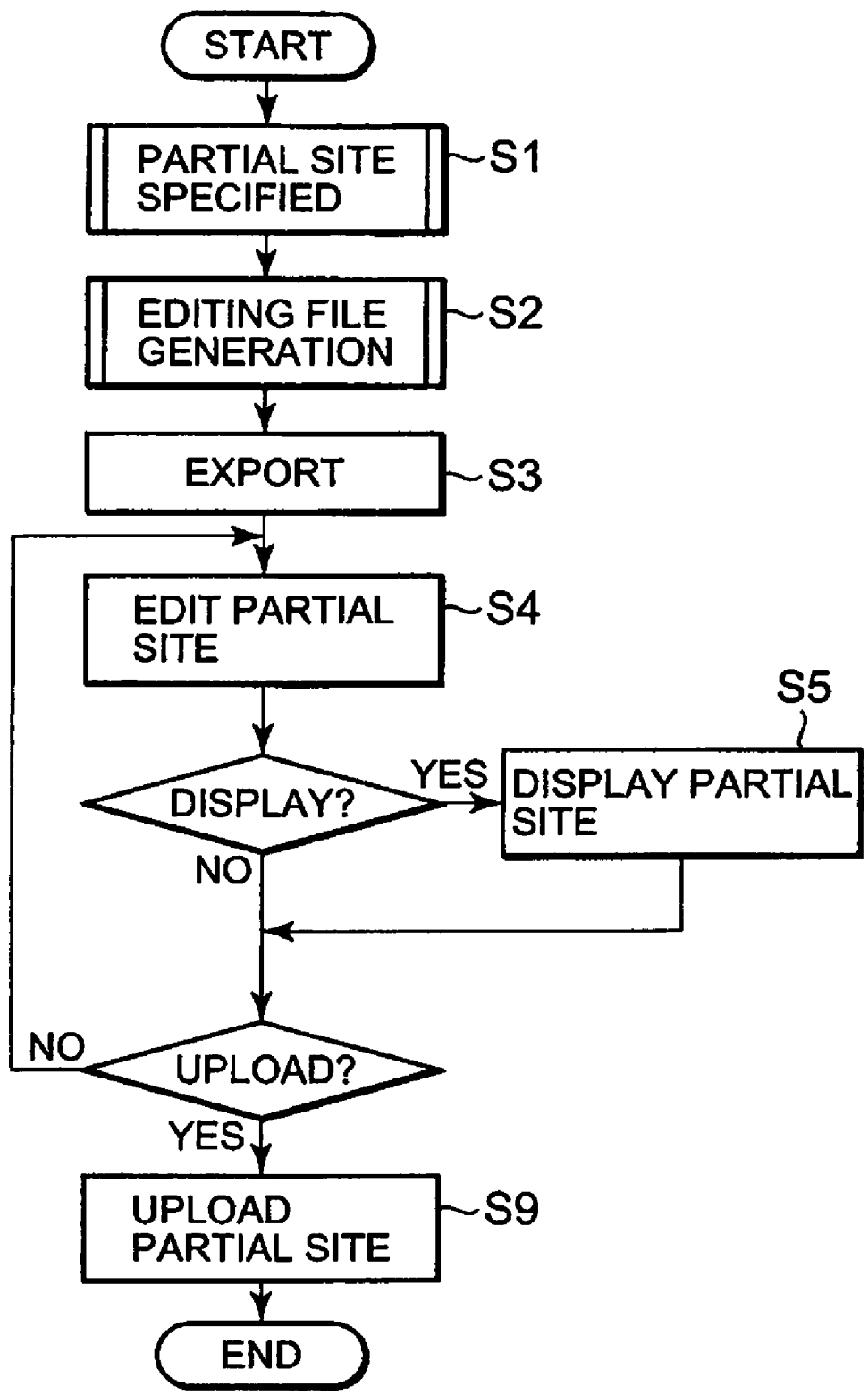
FIG. 16 is a flowchart showing the basic operation of the editing system according to the third embodiment.

Referring to FIG. 16, there is shown a flowchart illustrating the basic operation of the network editing system according to the third embodiment. In this network editing system, the edited partial web site S(P') is uploaded from the second computer system 2 directly to the web site 4 by an information communication network 100, unlike the first embodiment.

Although certain preferred embodiments have been shown and described, it will be understood that many changes and modifications may be made therein without departing from the scope and intent of the appended claims.

The invention claimed is:

1. A method of editing a web site by using a plurality of editing environments including at least first and second editing environments, the web site being composed of a plurality of web pages and being stored in the first editing environment, the method comprising:
in the first editing environment,
accepting a user specification of a part of the plurality of web pages as a partial site; and
generating an editing file including a specific file, which corresponds to the web pages included in the partial site, and a common file potentially used for editing the partial site.

2. The method according to claim 1, wherein the common file is related to other web pages of the entire website, which are not included in the partial site.

3. The method according to claim 1, wherein the common file includes link information indicating link destinations from the web pages constituting the partial site.

4. The method according to claim 1, wherein the step of accepting includes:
displaying the plurality of web pages constituting the web site in a form of a tree structure based on their link relation; and
accepting a user specification of a certain web page and web pages subordinate to the certain web page displayed in the tree structure as a partial site.

5. The method according to claim 1, wherein the common file is generated by:
accepting a user selection of a file related to other web pages of the entire website that are not included in the partial site; and
specifying the file selected by the user as the common file.

6. The method according to claim 1, wherein the step of generating includes generating an editing folder corresponding to the editing file in a subordinate class of a folder corresponding to the web site.

7. The method according to claim 1, further comprising exporting the editing file generated in the generation step from the first editing environment to the second editing environment.

8. The method according to claim 7, further comprising editing the file exported in the export step in the second editing environment.

9. The method according to claim 8, wherein:
the common file includes link information indicating link destinations from the web pages constituting the partial site; and
the step of editing includes adding the link information to the specific file.

10. The method according to claim 8, wherein:
the common file includes relative path information in the first editing environment to web materials of other web pages, which are not included in the partial site, and meta information of the web materials;
the editing step includes adding the relative path information and the meta information to the specific file; and
the display step includes displaying the web materials based on the meta information.

11. The method according to claim 8, wherein:
the common file includes actual information on web materials of other web pages, which are not included in the partial site;
the editing step includes adding the actual information to the specific file; and
the display step includes displaying the web materials based on the actual information.

12. The method according to claim 8, wherein:
the web site is uploaded to a web server on an information communication network;
the common file includes absolute path information in the information communication network to web materials of other web pages, which are not included in the partial site;
the editing step includes adding the absolute path information to the specific file; and
the display step includes acquiring actual information on the web server of the web materials based on the absolute path information and displaying the web materials based on the actual information.

13. The method according to claim 8, further comprising:
a step of importing the editing file edited in the editing step from the second editing environment to the first editing environment; and
a step of rebuilding the web site based on the editing file imported in the import step in the first editing environment.

14. The method according to claim 1, wherein the plurality of editing environments includes a third editing environment, the method further comprising:
in the first editing environment,
specifying a part of the plurality of web pages as a first partial site;
specifying another part of the plurality of web pages as a second partial site;
generating a first editing file including a first specific file corresponding to the web pages included in the first partial site and a first common file potentially used for editing the first partial site;
generating a second editing file including a second specific file corresponding to the web pages included in the second partial site and a second common file potentially used for editing the second partial site;
exporting the first editing file generated in the first generation step from the first editing environment to the second editing environment; and
exporting the second editing file generated in the second generation step from the first editing environment to the third editing environment.

15. A system for editing a web site, comprising:
storage means for storing the web site composed of a plurality of web pages;
specification means for accepting that a user specification of a part of the plurality of web pages as a partial site; and
generation means for generating an editing file including a specific file, which corresponds to the web pages included in the partial site, and a common file potentially used for editing the partial site.

16. A system according to claim 15, further comprising export means for exporting the editing file generated by the generation means from the storage means to another editing system.

17. A computer program product stored on a computer readable medium for causing a computer to function as an editing system for editing a web site, the computer program product containing instructions causing the computer to perform:

a storage function of storing the web site composed of a plurality of web pages;

a specification function of accepting a user specification of a part of the plurality of web pages as a partial site; and a generation function of generating an editing file including a specific file, which corresponds to the web pages included in the partial site, and a common file potentially used for editing the partial site.

18. The computer program product according to claim 17, wherein the computer program product causes the computer to perform an export function of exporting the editing file generated by the generation function from the editing system to another editing system.

19. A computer program product for causing a computer to function as an editing system for editing a web site, wherein:

the web site is composed of a plurality of web pages;

a part of the plurality of web pages is considered as a partial site; and an editing file includes a specific file, which corresponds to the web pages included in the partial site and a common file potentially used for editing the partial site, the program causing the computer to perform:

an input function of accepting an export of the editing file from another editing system; and an editing function of accepting that a user edits the editing file exported by the input function.

20. The computer program product according to claim 19, wherein the editing function includes accepting that the user edits the specific file and rejecting that the user edits the common file.

21. The computer program product according to claim 19, wherein the computer program product causes the computer to perform an import function of importing the editing file edited by the editing function from the editing system to another editing system.

* * * * *